United States Patent
Pieuchard et al.

[11] 3,930,728
[45] Jan. 6, 1976

[54] MONOCHROMATOR WITH CONCAVE GRATING

[75] Inventors: Guy Pieuchard, Fontenay-le-Fleury; Jean Flamand, Chatenay-Malabry; Geneviève Passereau, Bourg-la-Reine, all of France

[73] Assignee: Jobin-Yvon, Longjumeau, France

[22] Filed: July 19, 1974

[21] Appl. No.: 489,854

[30] Foreign Application Priority Data
Aug. 3, 1973   France .................. 73.28464

[52] U.S. Cl. .................. 356/99; 350/162 R
[51] Int. Cl.² .................. G01J 3/18
[58] Field of Search .................. 356/99, 100, 79; 350/162 R

[56] References Cited
UNITED STATES PATENTS
3,628,849   12/1971   Flamand et al. .................. 350/162 R

OTHER PUBLICATIONS
"Aberration–Corrected Concave Gratings Made Holographically" by Cordelle et al., published in the work *Optical Instruments and Techniques*, 1969, (Oriel Press, London), pp. 117–124.

*Primary Examiner*—Vincent P. McGraw
*Assistant Examiner*—F. L. Evans
*Attorney, Agent, or Firm*—Alan H. Levine

[57] ABSTRACT
Monochromator comprising a concave grating, the lines of which are situated at the intersection of the concave surface with a family of surfaces geometrically like the equiphasic surfaces obtained as loci of the luminous intensity maxima produced by the interference of two beams from two point sources C and D, an entry slit A and an exit slit B, wherein the polar coordinates of the points C and D and of the entry slit A and exit slit B in a system of polar coordinates having as its origin the apex of the grating and as reference axis the axis of the grating in a plane of reference passing through this axis are connected by the following relationships:

$$\tan \alpha \; \tan \beta = -\frac{1}{2}$$

$$\frac{1}{l_A} = -\frac{1}{R} \cdot \frac{3}{4} \cdot \frac{\sin 2\beta}{\cos\omega \, \cos 2\omega \, \sin\phi}$$

$$\frac{1}{l_B} = -\frac{1}{R} \cdot \frac{3}{4} \cdot \frac{\sin 2\alpha}{\cos\omega \, \cos 2\omega \, \sin\phi}$$

$$\left(\frac{1}{\sin\gamma - \sin\delta}\right)\left[\frac{\cos^2\gamma}{l_C} - \left(\frac{\cos\gamma}{R} - \frac{\cos^2\delta}{l_D - \frac{\cos\delta}{R}}\right)\right]\frac{\tan\omega}{R}$$

in which $(\alpha, l_A)$, $(\beta, l_B)$, $(\beta, l_C)$ and $(\delta, l_D)$ are the polar coordinates of A, B, C and D, respectively, R is the radius of curvature of the grating, $\omega = (\alpha+\beta)/2$ and $\phi = (\alpha-\beta)/2$.

4 Claims, 2 Drawing Figures

MONOCHROMATOR WITH CONCAVE GRATING

FIELD OF THE INVENTION

The invention relates to a monochromator having a concave grating in which the lines of the grating are situated at the intersection of the concave surface with a family of surfaces which geometrically are like the equiphasic surfaces obtained as loci of luminous intensity maxima produced by the interference of two beams emitted from two point sources.

By "geometrically like" is meant that the said surfaces have the same relative positions as the equiphasic surfaces.

BACKGROUND OF THE INVENTION

The invention applies in particular to monochromators with holographically made concave gratings, that is to say that although the holographic process is the only one at present available for obtaining such gratings, the scope of the present invention is not restricted to this particular process of manufacture.

The principle of the process of manufacturing a grating by holography is already known. Reference may be had, for example, to French Pat. No. 2,036,613.

For the purpose of the present description, it will suffice to recall the broad outlines of the manufacturing process with reference to FIG. 1 of the attached drawing.

The process consists of causing two coherent light waves $\Sigma_C$ and $\Sigma_D$ emitted from two points C and D and originating from a laser to fall on a layer S under such conditions that the surfaces of interference of the two waves intersect the layer, the light energy concentrated on these surfaces producing sufficient modification of the layer at the zones of intersection.

This layer may be, for example, a layer of photopolymerisable resin deposited on an optically bright, polished surface of a support made of any suitable material and having any suitable form, for example a support made of glass or silica, the sensitive surface of which is concave and may have, for example, the form of a spherical calotte.

A solvent is then applied to dissolve selectively either the resin which has been polymerised by the light energy or the resin which has not been polymerised, so that the lines of the grating appear.

If it is desired to obtain a grating by reflection, the surface of the grating is subsequently metallised under vacuum.

The production of monochromators with such gratings has already been envisaged, see for example French Patent 70 27186.

A disadvantage commonly found in conventional monochromators having a concave grating is that they require a multiplicity of mechanical movements including translations and rotations to obtain the desired separation of the spectrum. A type of monochromator which does not have this disadvantage is known but in it the freedom from this defect is achieved only at the expense of the qualities of resolution and luminosity.

SUMMARY OF THE INVENTION

The present invention seeks to provide a monochromator which has the double advantage of simplicity of its movements, which are limited to a rotation of the grating, and of luminosity, which is achieved by reduction of the astigmatism, in addition to an improvement in the power of resolution.

The object of the present invention is to define a monochromator which has good correction in the wavelength region of 3000–7000 Å combined with a good quality factor, that is to say good qualities of luminosity and resolution.

To illustrate the description, FIG. 2 of the attached drawing shows the basic principle of a monochromator having a grating S, an entry slit A and an exit slit B. It is assumed that the grating S has been obtained by the interference of coherent light waves from two foci C and D, as shown in FIG. 1.

In a reference plane containing the normal to the grating at its apex, if one takes as origin the apex of the grating and as axis the normal to the grating, the polar coordinates in this plane of the entry slit A and the exit slit B of the monochromator and of the points C and D which define the foci of the family of quadric generatrices of the grating will be defined by:

A $(\alpha, l_A)$
B $(\beta, l_B)$
C $(\gamma, l_C)$
D $(\delta, l_D)$ the angles being taken as positive in the trigonometric sense.

It has been discovered that a monochromator with the desired performance characteristics is obtained if the following relations are observed between these coordinates:

$$\tan\alpha \cdot \tan\beta = -\frac{1}{2}$$

$$\frac{1}{l_A} = -\frac{1}{R} - \frac{3}{4} \frac{\sin 2\beta}{\cos\omega \cos 2\omega \sin\phi}$$

$$\frac{1}{l_B} = \frac{1}{R} - \frac{3}{4} \frac{\sin 2\alpha}{\cos\omega \cos 2\omega \sin\phi}$$

$$\left(\frac{1}{\sin\gamma - \sin\delta}\right)\left[\frac{\cos^2\gamma}{l_C} - \frac{\cos\gamma}{R} - \left(\frac{\cos^2\delta}{l_D} - \frac{\cos\delta}{R}\right)\right] = \frac{\tan\omega}{R}$$

in which:
R is the radius of curvature of the grating, $\omega = (\alpha+\beta)/2$ (where $\omega$ is the angle of rotation of the grating)
$\phi = (\alpha-\beta)/2$ (where $2\phi$ is the angle at which the two slits at the summit of the grating are viewed.)

The following embodiments which have the minimum residual aberrations are preferred:

| | | | |
|---|---|---|---|
| 1500 ≤ | N | ≤ | 2000 |
| 51° ≤ | $\gamma$ | ≤ | 76° |
| 2° ≤ | $\delta$ | ≤ | 6° |
| 0.8R ≤ | $l_C$ | ≤ | 1.1R |
| 3R ≤ | $l_D$ | ≤ | 35R |
| 75° ≤ | $2\phi$ | ≤ | 95° |
| 0.9R ≤ | $l_A$ | ≤ | 1.1R |
| 0.4R ≤ | $l_B$ | ≤ | 0.6R |

(N being the number of lines per millimeter of the grating)

GENERAL DESCRIPTION OF THE DRAWINGS

DETAILED DESCRIPTION OF THE INVENTION

Figure 1:
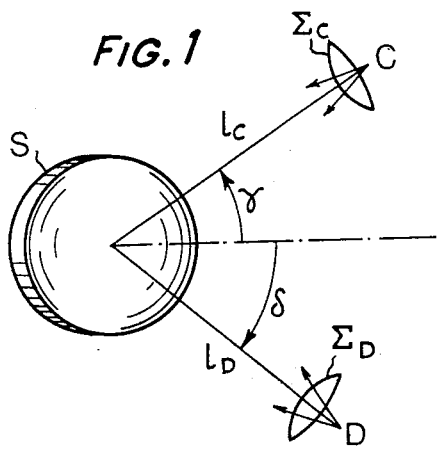
FIG. 1 illustrates a process for manufacturing a grating for use in the monochromator of the present invention.
Figure 2:
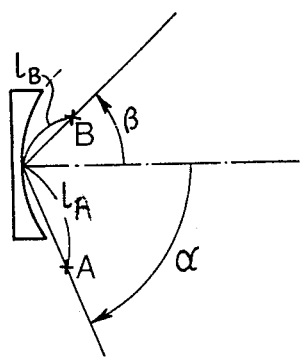
FIG. 2 is a diagram showing the principal parameters of the monochromator of the present invention.

In the Figures,
A is the entry slit
B is the exit slit
S is the grating
C and D are the points from which the coherent light waves are emitted to produce the grating S.
($\alpha$, $l_A$) is the polar coordinate of A
($\beta$, $l_B$) is the polar coordinate of B
($\gamma$, $l_C$) is the polar coordinate of C
($\delta$, $l_D$) is the polar coordinate of D Two examples of monochromators constructed in accordance with the invention are described in the following Examples.

EXAMPLE 1

A monochromator with the following parameters is produced:
Grating: a concave spherical calotte with 1584 lines to per mm, corrected for 5772.2 A.

| Constructions points of the grating: | | |
|---|---|---|
| C : | $l_C = 0.929 R$ | $\gamma = 59.2°$ |
| D : | $l_D = 6.630 R$ | $\delta = 5°$ |
| Slits of the monochromator: | | |
| A : | $l_A = 1.055 R$ | |
| | | $2\phi = 85.7°$ |
| B : | $l_B = 0.536 R$ | |

The relative defocalisation of the different wavelengths which is directly connected to the resolution, is as follows:

| $\lambda$ | $\dfrac{\Delta l_B}{l_B}$ |
|---|---|
| 4000 | 0.019% |
| 5000 | 0.006% |
| 6000 | 0.001% |

EXAMPLE 2

A monochromator with the following parameters is produced:
Grating: a concave spherical calotte having 1683 lines per mm.

| Construction points of the grating: | | |
|---|---|---|
| C : | $l_C = 1.03 R$ | $\gamma = 65.3°$ |
| D : | $l_D = 9.68 R$ | $\delta = 5°$ |

Slits of the monochromator:
As in example 1.

The relative defocalisation of the different wavelengths, which is directly connected with the resolution, is as follows:

| $\lambda$ | $\dfrac{\Delta l_B}{l_B}$ |
|---|---|
| 4000 | 0.021% |
| 5000 | 0.000% |
| 6000 | 0.002% |

We claim:

1. A monochromator comprising a concave grating the lines of which are situated at the intersection of the concave surface with a family of surfaces geometrically like the equiphasic surfaces obtained as loci of the luminous intensity maxima produced by the interference of two beams from two point sources C and D, means defining an entry slit A and means defining an exit slit B, wherein the polar coordinates of said points C and D and of said entry slit A said exit slit B in a system of polar coordinates having as its origin the apex of said grating and as reference axis the axis of said grating in a plane of reference passing through the axis are connected by the following relationships:

$$\tan \alpha \cdot \tan \beta = -\frac{1}{2}$$

$$\frac{1}{l_A} = \frac{1}{R} - \frac{3}{4} \cdot \frac{\sin 2\beta}{\cos\omega \cos 2\omega \sin\phi}$$

$$\frac{1}{l_B} = \frac{1}{R} - \frac{3}{4} \cdot \frac{\sin 2\alpha}{\cos\omega \cos 2\omega \sin\phi}$$

$$\left(\frac{1}{\sin\gamma - \sin\delta}\right)\left[\frac{\cos^2\gamma}{l_C} - \frac{\cos\gamma}{R} - \left(\frac{\cos^2\delta}{l_D} - \frac{\cos\delta}{R}\right)\right] = \frac{\tan\omega}{R}$$

in which ($\alpha$, $l_A$), ($\beta$, $l_B$), ($\gamma$, $l_C$) and ($\delta$, $l_D$) are the polar coordinates of A, B, C and D, respectively, R is the radius of curvature of said grating, $\omega = (\alpha+\beta)/2$, $\omega$ being the angle of rotation of the grating, and $\phi=(\alpha-\beta)/2$, $2\phi$ being the angle at which the two slits at the summit of the grating are viewed.

2. Monochromator according to claim 1, wherein

| $1500 \leq N \leq 2000$ | (N being the number of lines per mm of said grating) |
| $51° \leq \gamma \leq 76°$ | |
| $2° \leq \delta \leq 6°$ | |
| $0.8R \leq l_C \leq 1.1R$ | |
| $3R \leq l_D \leq 35R$ | |
| $75° \leq 2\phi \leq 95°$ | |
| $0.9R \leq l_A \leq 1.1R$ | |
| $0.4R \leq l_B \leq 0.6$. | |

3. Monochromator according to claim 2, wherein said grating is a concave spherical calotte having 1584 lines per mm, and:

| $l_C = 0.929R$ | $\gamma = 59.2°$ |
| $l_D = 6.630R$ | $\delta = 5°$ |
| $l_A = 1.055R$ | |
| $l_B = 0.536R$ | $2\phi = 85.7°$. |

4. Monochromator according to claim 2, wherein said grating is a concave spherical calotte having 1683 lines to the mm and.

$l_C = 1.03R$  $\gamma = 65.3°$
$l_D = 9.68R$  $\delta = 5°$ $l_A = 1.055R$
$l_B = 0.536R$  $2\phi = 85.7°$

\* \* \* \* \*